No. 812,519. PATENTED FEB. 13, 1906.
J. PETRELLI.
POWER TRANSMITTING MECHANISM.
APPLICATION FILED MAR. 11, 1905.
3 SHEETS—SHEET 1.
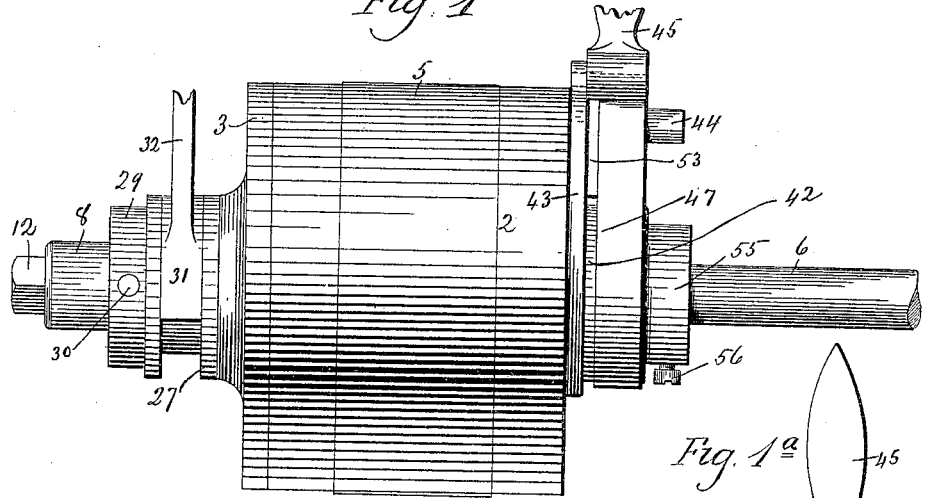
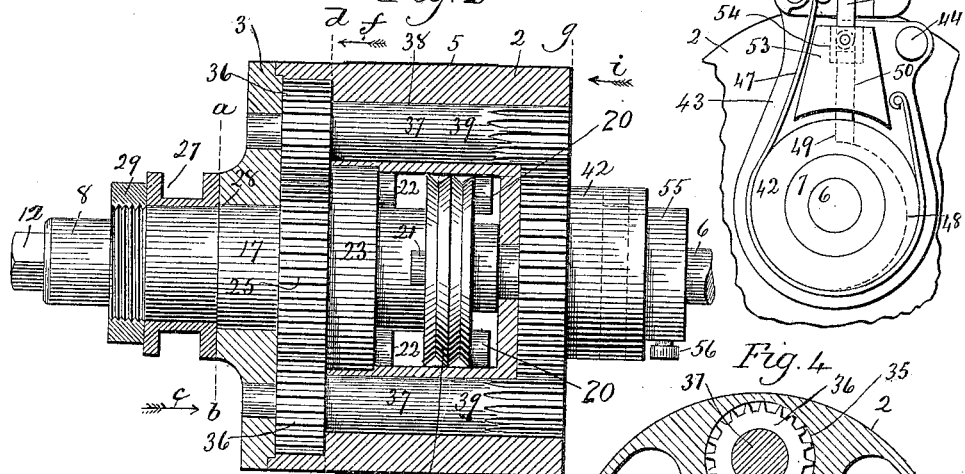
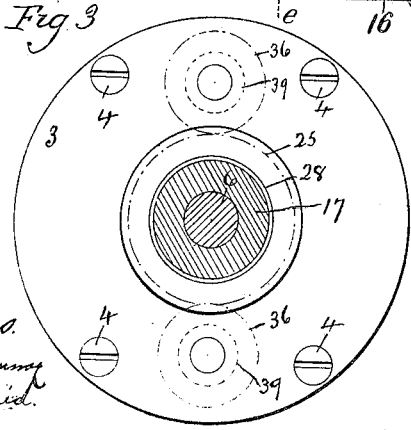

No. 812,519. PATENTED FEB. 13, 1906.
J. PETRELLI.
POWER TRANSMITTING MECHANISM.
APPLICATION FILED MAR. 11, 1905.
3 SHEETS—SHEET 2.
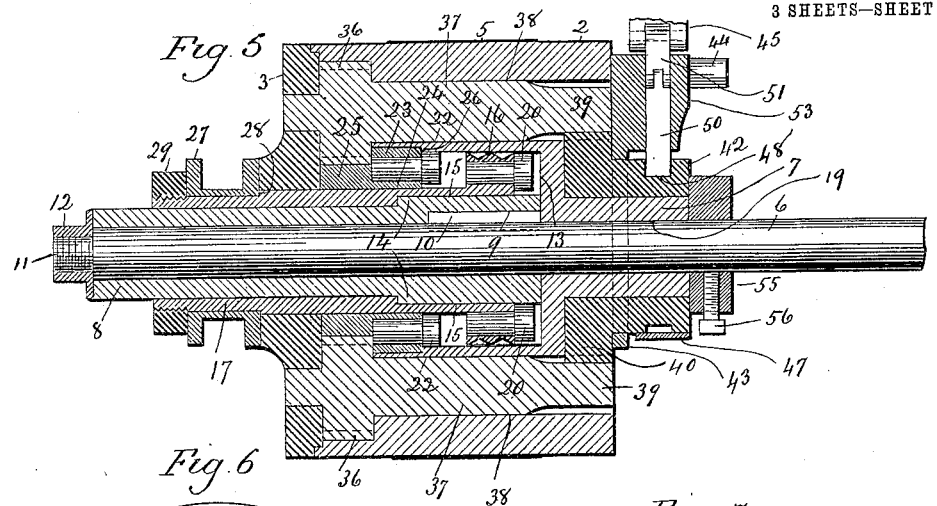
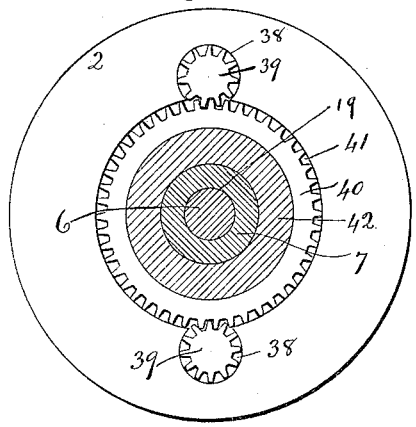
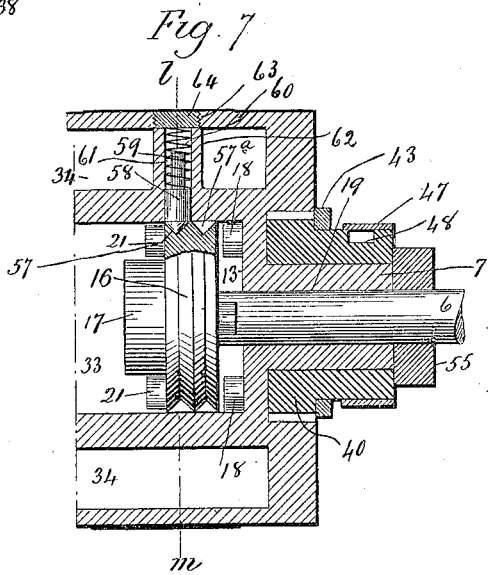
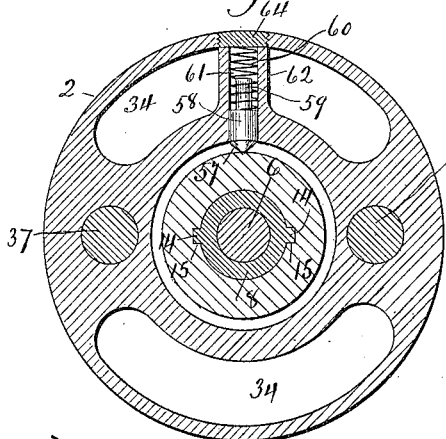
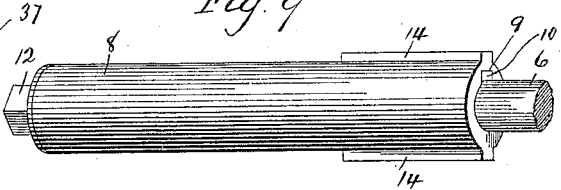

No. 812,519. PATENTED FEB. 13, 1906.
J. PETRELLI.
POWER TRANSMITTING MECHANISM.
APPLICATION FILED MAR. 11, 1905.
3 SHEETS—SHEET 3.
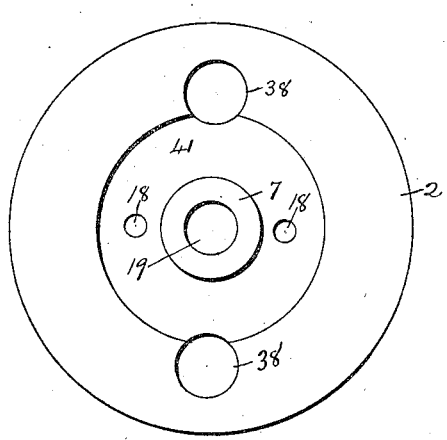
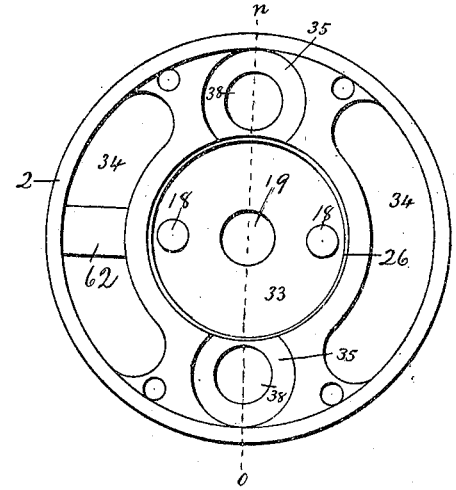
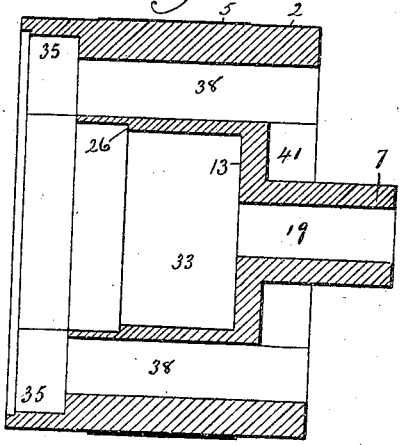
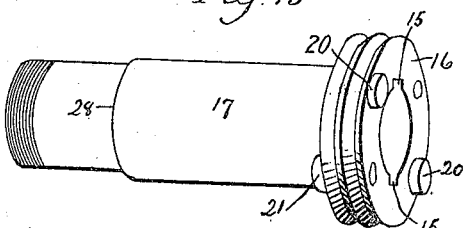
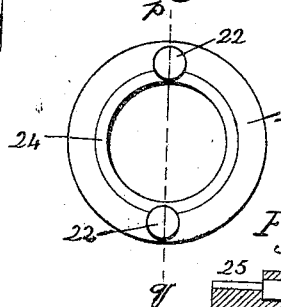
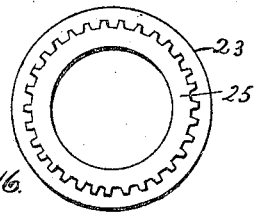
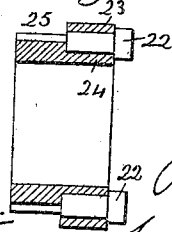

UNITED STATES PATENT OFFICE.

JOSEPH PETRELLI, OF NEW HAVEN, CONNECTICUT, ASSIGNOR TO THE SNOW & PETRELLI MFG. CO., OF NEW HAVEN, CONNECTICUT, A CORPORATION.

POWER-TRANSMITTING MECHANISM.

No. 812,519.    Specification of Letters Patent.    Patented Feb. 13, 1906.

Application filed March 11, 1905. Serial No. 249,639.

*To all whom it may concern:*

Be it known that I, JOSEPH PETRELLI, a citizen of the United States, residing at New Haven, in the county of New Haven and State of Connecticut, have invented a new and useful Improved Power-Transmitting Mechanism; and I do hereby declare the following, when taken in connection with the accompanying drawings and the figures of reference marked thereon, to be a full, clear, and exact description of the same, and which said drawings constitute part of this specification, and represent, in—

Figure 1, a view of a power-transmitting mechanism constructed in accordance with my invention; Fig. 1ª, a broken end view thereof looking toward the controller; Fig. 2, a view of the device with its case in central longitudinal section, the other parts being shown in side elevation; Fig. 3, a view of the device in transverse section on the line *a b* of Fig. 2 looking in the direction of the arrow *c;* Fig. 4, a view of the device in transverse section on the line *d e* of Fig. 2 looking in the direction of the arrow *f;* Fig. 5, a view of the device in central longitudinal section; Fig. 6, a view of the device in transverse section on the line *g h* of Fig. 2 looking in the direction of the arrow *i;* Fig. 7, a broken view of the device in central longitudinal section on the line *j k* of Fig. 4, this view showing in particular the means for locking the coupling-sleeve in its respective operating positions; Fig. 8, a view of the device in transverse section on the line *l m* of Fig. 7; Fig. 9, a detached broken perspective view of the driven shaft to show its fixed coupling-hub; Fig. 10, a detached view, in rear end elevation, of the chambered case of the device, showing it stripped; Fig. 11, a corresponding front view of the case of the device; Fig. 12, a detached view of the case in vertical longitudinal section on the line *n o* of Fig. 11; Fig. 13, a detached perspective view of the coupling-sleeve; Fig. 14, a detached rear view of the driven gear; Fig. 15, a front view thereof; Fig. 16, a sectional view thereof on the line *p q* of Fig. 14.

My invention relates to an improved power-transmitting mechanism, the object being to produce an effective device constructed with particular reference to simplicity, cheapness, and durability, the number of parts being reduced to the minimum, and their construction being very strong.

With these ends in view my invention consists in a power-trasmitting mechanism having certain details of construction and combinations of parts, as will be more fully hereinafter described and pointed out in the claims.

For the purpose of illustrating my invention I have chosen to show its embodiment in a power-transmitting mechanism having provision for a reverse rotation of the shaft; but I do not, as I would have it clearly understood, limit myself to this use of my invention. As herein shown, then, I employ a cylindrical chambered rotatable case 2, having its inner end closed and its outer end provided with a removable circular plate-like head or cover 3, secured in place by screws 4. This case constitutes, as it were, the primary driving member of the device, and the power is applied to it in any suitable and convenient way, according to the particular form the device may assume and according to the particular situation in which it is to be used. As shown, the periphery of the case is formed with a slight crown 5 for the reception of a driving-belt. The power transmitted by a belt or other suitable means to the said case 2 is utilized for driving the driven shaft 6, which may be driven forward or reversed, and which passes through a concentric bearing-hub 7, formed integral with the said case 2 and providing a bearing therefor upon the shaft.

For coupling the case 2 and the shaft 6 together the shaft is provided with a long sleeve-like coupling-hub 8, formed at its inner end with a longitudinal groove 9, receiving a key 10, formed upon the shaft 6, whereby the hub 8 is held against rotation thereupon. The outer end of the shaft is formed with a threaded stem 11, receiving a nut 12, bearing against the outer end of the hub 8, which is thus held against endwise outward movement, being held against endwise inward movement by the bearing of its inner end against the bottom 13 of the case 2. The said coupling-hub 8 is formed at its inner end with two long oppositely-projecting ribs 14, which take into two corresponding grooves 15, formed in a fixed coupling-collar 16, located at the inner end of a coupling-sleeve 17, mounted so as to slide upon the said hub, the said grooves 15 extending transversely through the collar 16 and into the body of the sleeve 17. The said ribs 14 are made long enough to prevent the sleeve 17 from ever being uncoupled from the hub 8, on which it is longitudinally moved for coupling the shaft with the case for driving the shaft forward therewith or for coupling the shaft with the gearing for reversing its motion, as will be described later on.

For coupling the shaft with the case for driving the shaft forward I employ two coupling-pins 18, located in the bottom wall 13 of the case 2 on opposite sides of the bearing-hole 19 of the hub 7. These two coupling-pins 18 coact with two correspondingly-arranged coupling-pins 20, projecting from the inner face of the coupling-collar 16 aforesaid.

For the reverse rotation of the shaft I employ two coupling-pins 21, arranged opposite each other and quartering with respect to the two coupling-pins 20 aforesaid and projecting from the outer face of the said coupling-collar 16 for coaction with two corresponding coupling-pins 22, projecting from the inner face of a coupling-collar 23, rigidly secured to a sleeve 24, projecting from the inner face of a driven or reversing gear 25, mounted upon the coupling-sleeve 17 so as to be free to rotate thereupon and held in place against endwise movement thereupon by the bearing of the inner face of its said collar 23 against a shoulder 26, Fig. 12, formed within the case 2, and by the bearing of its outer face against the inner face of the plate-like cover 3, Fig. 2.

To provide for longitudinally moving the coupling-sleeve 17 upon the hub 8 as required to bring the pins 20 into position to coact with the pins 18 and the pins 21 into position to coact with the pins 22, the outer end of the hub 17 is reduced in diameter and passed through the plate-like cover 3 and provided with a clutch-collar 27, held against rotation by being brought to a bearing upon the shoulder 28 of the sleeve by means of a check-nut 29, mounted upon the extreme outer end of the said sleeve, which is threaded for the purpose. This check-nut is furnished with a radial hole 30 for the reception of a spanner-wrench or other equivalent means for operating it. The said clutch-collar 27 receives and is operated by a clutch-fork 31 of ordinary construction and operated by hand or automatically, according to circumstances. As shown, the fork has a stem or shank 32 constituting a lever for its operation.

The coupling-collar 16, the coupling-sleeve 17, the coupling-collar 23, and the driven or reversing gear 25 are all located within a chamber 33, occupying the center of the case 2 and just enough larger than the collars 16 and 23 to receive the same. As herein shown, the case is lightened by coring it out to form two segmental chambers 34, located opposite each other and separated at their ends by two cylindrical recesses 35, opening laterally inward into the outer end of the said main central chamber 33; but the specific chambering of the case 2 may be changed as may be desired. The said driven or reversing gear 25 meshes with two driven pinions 36, respectively, housed in the recesses 35 aforesaid and located upon the outer ends of short shafts 37, extending rearward through bearing-holes 38 in the case 2 and formed at their rear ends with relatively smaller driving-pinions 39, meshing into a fulcrum-gear 40, larger than the said gear 25, located in a circular recess 41, formed in the outer face of the bottom 13 of the case and encircling, so to speak, the inner end of the bearing-hub 7 thereof. As the case 2 revolves the pinions 39 and 36 are revolved planetwise around the gears 40 and 25, with which they are directly intermeshed respectively.

If the fulcrum-gear 40 is either held fast against rotation or retarded against rotation, the said pinions and the gear 25 are rotated in the reverse direction from the rotation of the fulcrum-case; but if the said gear 40 is not so held fast or retarded against rotation it will simply slip under the driving-pinions 39, so that they will remain at rest except for their planetary movement with the case. In other words, the gearing comprising the gears 40 and 25, the driven pinions 36, and the driving-pinions 39 is ineffective and negligible unless the fulcrum-gear 40 is held so as to constitute a point of purchase for the driving-pinions 39.

As herein shown, the fulcrum-gear 40 is formed with an outwardly-extending hub 42, to which a controller combining a friction-brake and positive stop is applied. The said controller comprises a frame-plate 43, swiveled upon the hub 42 and having a stop pin or arm 44 designed to engage with some fixed point exterior to the device, so as to prevent the frame-plate 43 from rotating with the hub 42. A pivotal handle 45, hung upon a pin 46, mounted in the plate 43, has connected with it the outer end of a band or strap 47, encircling the hub 42 and having its inner end connected with the plate 43. By swinging the handle from right to left the strap 47 is tightened on the hub 42, with the production of enough friction to retard the rotation of the gear 40 or stop its rotation altogether. By swinging the handle, as described, gradually the friction may be gradually applied, so as to gradually retard or gradually bring the gear 40 to a stop. For positively holding the gear 40 against rotation the hub 42 is grooved to form a stop-cam 48, the "drop" of which forms a stop-shoulder 49, engaged by the inner end of a bolt 50, the outer end of which is connected with the inner end of a link 51, the outer end of which is pivoted to the handle 45 within a chamber 52 in the base thereof. The bolt 50 plays back and forth in a head 53, formed upon the frame-plate 43 and furnished with a chamber 54 for the clearance of the link 51. It will be apparent by reference to Fig. 1ª that when the handle 45 is swung from right to left the strap 47 will be tightened upon the hub 42 and that the bolt 50 will be cleared from the stop-shoulder 49, so as to permit the hub 42 and the gear 40 to rotate under the restraint of the strap 47. On the other hand, when the handle is moved from left to right the strap 47 is slacked and the bolt 50 brought into position to engage with the stop-shoulder 49 for positively holding the gear 40 against rotation. The controller may, however, assume other forms, and I do not limit myself to that just described, the only requirement being that a device suitable for controlling the gear 40 be chosen. A collar 55, having a set-screw 56, mounted upon the shaft 6 and brought to a bearing against the ends of the hubs 7 and 42, prevents the movement of the case 2 upon the shaft 6 in one direction, the movement of the case in the opposite direction being prevented by the bearing of the inner end of the coupling-hub 8 upon the bottom 13 of the case, as already described.

In order to hold the movable coupling-sleeve 17 in one or the other of its two operating positions, the coupling-collar 16 is formed in its periphery with two continuous V-shaped grooves 57 57ª, corresponding to each other, located side by side and adapted to receive the pointed nose of a yielding locking-plunger 58, having a stem 59, surrounded by a coiled spring 60. This plunger is located in a transverse hole 61 in the case 2, while its spring 60 is confined within a thimble 62, cast into the case 2 so as to extend through one of the two concentric chambers 34. For the introduction of the plunger and its spring a hole 63 is bored in the case in line with the thimble 35 and normally closed by a screw-plug 64. When the coupling-sleeve 17 is moved in one direction or the other through the medium of the clutch-fork 31, the plunger 58 rides against the tension of the spring 60 into one or the other of the two V-shaped grooves 57 57ª and operates to hold the coupling-sleeve in either one of its two positions, in one of which the shaft is coupled for forward movement with the case and in the other of which the pinions and gears are brought into play for causing the shaft to reversely rotate while the case moves forward.

The case 2 is always rotated forward and constitutes, as I have already explained, the primary driving member of the device. Now when the coupling-sleeve 17 is moved inward to bring the coupling-pins 20 into position for coaction with the coupling-pins 18 the case 2 will be coupled to the shaft and the same driven forward. As the shaft is driven forward the gears and pinions of the reversing mechanism remain at rest beyond the planetary revolution of the pinions around the gears and the idle rotation thereof on their axes, for the reason that the fulcrum-gear 40 is allowed to rotate unrestrained by the strap 47 or the bolt 50, and so affords no point of purchase for the pinions 39. When, however, it is desired so cause the reverse rotation of the shaft 6, the clutch-fork 31 is operated to draw the coupling-sleeve 17 outward, causing the coupling-pins 20 to break engagement with the coupling-pins 18 and the coupling-pins 21 to make engagement with the coupling-pins 22, whereby the reversing-gear 25 is coupled with the shaft 6. The idle rotation of the fulcrum-gear 40 is now retarded or wholly stopped by means of the strap 47 or the bolt 50. Just as soon as the said strap or bolt takes effect the gear begins to function by forming a purchase for the driving-pinions 39, which then begin to turn on their own axes, as well as to revolve planetwise around the gears 25 and 40. The gearing having now been put in operation will effect the reverse rotation of the shaft 6 at a speed dependent upon the action of the brake. If the controller holds the fulcrum-gear 40 fast, the shaft will be reversed at the maximum speed, otherwise at a speed directly proportional to the extent to which the gear 40 is retarded and held against slipping. In either case the shaft 6 will rotate reversely while the case is rotating forwardly until the coupling-sleeve is again moved inward into its first position. By employing a friction-brake for retarding or stopping the fulcrum-gear I am enabled to make the transition from forward to reverse movement gradually and without the shock which would otherwise occur and endanger the device. Suppose, for instance, that the device is applied to a motor-boat and being run very rapidly. When it is desired to reverse the motion, the brake is applied so as to gradually bind the strap upon the hub of the fulcrum-gear, which effects the gradual picking up, so to speak, of the power, because some of the power is lost as long as the fulcrum-gear slips at all within the brake. When the reverse movement is well under way, the brake may be tightened so that the fulcrum-gear will not slip at all under the maximum load, or the gear may be positively locked at any time by using the bolt 50.

It will be readily understood that by suitably differentiating the two gears and the two pinions the speed of the maximum reverse rotation of the shaft will be predetermined. Furthermore, if desired, the fulcrum-gear 40 may be made smaller than the reversing-gear 25 and the driven pinion smaller than the driving-pinion, causing them to rotate in the same direction as the case, but differentially therefrom as to speed. The same effect may be secured by controlling the driven gear 25 and leaving the gear 40 free at all times to rotate, causing the forward rotation of the gears and pinions and the differential forward rotation of the shaft with respect to the case without changing the size of the gears and pinions. All of these changes are so obvious that their illustration is thought to be wholly unnecessary. It is therefore apparent that in carrying out my invention some changes from the construction herein shown and described may be made. I would therefore have it understood that I do not limit myself thereto, but hold myself at liberty to make such departures therefrom as fairly fall within the spirit and scope of my invention.

Having fully described my invention, what I claim as new, and desire to secure by Letters Patent, is—

1. In a power-transmitting mechanism, the combination with a rotatable case, of a driven shaft, a fulcrum-gear and a driven gear differentiated from each other in size and arranged concentric with the said case and shaft, a driving-pinion and a driven pinion differentiated in size, rotating together on the same axis, meshing directly into the said fulcrum and driven gears respectively and revolved planetwise around the same with the said case; a controller for the said fulcrum-gear, and means for transmitting the rotatable movement of the said case to the said shaft for the direct rotation thereof and for transmitting the movement of the said driven gear to the said shaft for the rotation thereof thereby.

2. In a power-transmitting mechanism, the combination with a rotatable case, of a driven shaft, a fulcrum-gear and a relatively smaller driven gear arranged concentric with the said case and shaft, a driving-pinion and a relatively larger driven pinion rotating together on the same axis, meshing directly into the said fulcrum and driven gears respectively, and revolved planetwise around the same with the said case; a controller for the fulcrum-gear, and means for transmitting the rotatable movement of the said case to the said shaft for the forward rotation thereof, and for transmitting the movement of the said driven gear to the said shaft for the reverse rotation thereof thereby.

3. In a power-transmitting mechanism, the combination with a rotatable case having a concentric hub, of a driven shaft, a fulcrum-gear mounted upon the said hub, a driven gear differentiated in size with respect to the said fulcrum-gear and concentric therewith, a driving-pinion and a driven pinion, differentiated in size, rotating together on the same axis, meshing directly into the fulcrum and driven gears respectively, and revolved planetwise around the same with the said case; a controller for the said fulcrum-gear, and means for transmitting the rotatable movement of the said case to the said shaft for the direct rotation thereof, and for transmitting the movement of the said driven gear to the said shaft for the rotation thereof thereby.

4. In a power-transmitting mechanism, the combination with a rotatable case, of a driven shaft, a fulcrum-gear and a driven gear differentiated from each other in size and arranged concentric with the said case and shaft, a driving-pinion and a driven pinion differentiated in size, rotating together on the same axis, meshing directly into the said fulcrum and driven gears respectively and revolved planetwise around the same with the said case; a friction-brake whereby the said fulcrum-gear is retarded or stopped, and means for transmitting the rotatable movement of the said case to the said shaft for the direct rotation thereof, and for transmitting the movement of the said driven gear to the said shaft for the rotation thereof thereby.

5. In a power-transmitting mechanism, the combination with a rotatable case having a concentric hub, of a driven shaft, a fulcrum-gear mounted upon the said hub, a relatively smaller driven gear arranged concentric therewith, a driving-pinion and a relatively larger driven pinion rotating together on the same axis, meshing directly into the said fulcrum and driven gears respectively and revolved planetwise around the same with the said case; a controller for the said fulcrum-gear, and means for transmitting the rotatable movement of the said case to the said shaft for the direct rotation thereof, and for transmitting the movement of the said driven gear to the said shaft for the reverse rotation thereof thereby.

6. In a power-transmitting mechanism, the combination with a rotatable case, of a driven shaft, a fulcrum-gear and a driven gear differentiated from each other in size and arranged concentric with the said case and shaft, a driving-pinion and a driven pinion differentiated in size, rotating together on the same axis, meshing directly into the fulcrum and driven gears respectively and revolved planetwise around the same with the said case; a controller for the said fulcrum-gear, the said controller including a positive stop, and means for transmitting the rotatable movement of the said case to the said shaft for the direct rotation thereof and for transmitting the movement of the said driven gear to the said shaft for the rotation thereof thereby.

7. In a power-transmitting mechanism, the combination with a rotatable case, of a driven shaft, a fulcrum-gear and a driven gear differentiated from each other in size and arranged concentric with the said case and shaft, the said fulcrum-gear being formed with a hub, a driving-pinion and a driven pinion differentiated in size, rotating together on the same axis, meshing directly into the fulcrum and driven gears respectively and revolved planetwise around the same with the said case; a controller applied to the hub of the said fulcrum-gear, and means for transmitting the rotatable movement of the said case to the said shaft for the direct rotation thereof and for transmitting the movement of the said driven gear to the said shaft for the rotation thereof by the said gear.

8. In a power-transmitting mechanism, the combination with a rotatable case, of a driven shaft, a fulcrum-gear and a driven gear differentiated from each other in size and concentric with the said case and shaft, a driving-pinion and a driven pinion differentiated in size, rotating together on the same axis, meshing directly into the fulcrum and driven gears respectively and revolved planetwise around the same with the said case; a controller for the said fulcrum-gear, and clutch mechanism located between the said gears for coupling the shaft with the case and with the said driven gear.

9. In a power-transmitting mechanism, the combination with a rotatable case, of a driven shaft, a fulcrum-gear and a driven gear differentiated from each other in size and concentric with the said case and shaft, a driving-pinion and a driven pinion differentiated in size, rotating together on the same axis, meshing directly into the fulcrum and driven gears respectively and revolved planetwise around the same with the said case; a controller for the said fulcrum-gear, and a sliding coupling-sleeve mounted upon the said shaft and carrying coupling instrumentalities whereby the sleeve, and hence the shaft, are coupled with the case for the rotation of the shaft therewith, and with the driven gear for the rotation of the shaft thereby.

10. In a power-transmitting mechanism, the combination with a rotatable case, of a driven shaft, a fulcrum-gear and a driven gear differentiated from each other in size and concentric with the said case and shaft, a driving-pinion and a driven pinion differentiated in size, rotating together on the same axis, meshing directly into the fulcrum and driven gears respectively and revolved planetwise around the same with the said case; a controller for the said fulcrum-gear, a coupling-sleeve having sliding movement on the said shaft, a coupling-collar fixed upon the said sleeve and adapted to be coupled with the case whereby the shaft is rotated therewith, a coupling-collar combined with the said driven gear and coacting with the coupling-collar before mentioned for coupling the driven gear with the said sleeve, and means for longitudinally moving the said sleeve to couple the case with the sleeve or the sleeve with the driven gear.

11. In a power-transmitting mechanism, the combination with a rotatable case, of a driven shaft, a fulcrum-gear and a driven gear differentiated from each other in size and concentric with the said case and shaft, a driving-pinion and a driven pinion differentiated in size, rotating together on the same axis, meshing directly into the fulcrum and driven gears respectively and revolved planetwise around the same with the said case; a controller for the said fulcrum-gear, a sleeve mounted to slide on the said shaft and projecting outward through the case, coupling instrumentalities mounted upon the said sleeve for coupling the same with the case or with the driven gear as desired, and means applied to the projecting outer end of the sleeve for operating the same.

12. In a power-transmitting mechanism, the combination with a rotatable case, of a driven shaft, a fulcrum-gear arranged concentric with the said case and shaft and formed with a hub, a controller for the said gear applied to the said hub, a sleeve mounted on the shaft to slide thereupon, a relatively small driven gear mounted upon the said sleeve, a driving-pinion and a relatively large driven pinion mounted in the case, rotating together on the same axis, meshing directly into the fulcrum and driven gears respectively and revolved planetwise around the same with the said case, whereby the said driven gear is reversely rotated; coupling instrumentalities carried by the said sleeve whereby the shaft is coupled with the case or with the driven gear as desired, and means for operating the said sleeve.

13. In a power-transmitting mechanism, the combination with a rotatable case, of a driven shaft, a fulcrum-gear and a relatively small driven gear concentric with the said case, a shaft, a driving-pinion and a relatively large driven pinion rotating together on the same axis, meshing directly into the said fulcrum and driven gears respectively, and revolved planetwise around the same with the said case, whereby the driven gear is reversely rotated; a controller for the said fulcrum-gear, a sleeve mounted to slide upon the said shaft, coupling-pins carried by the said case, a coupling-collar fixed upon the said sleeve and provided with coupling-pins for coaction with the pins before mentioned, a coupling-collar rigid with the said driven gear, coupling-pins mounted therein, coupling-pins mounted in the collar on the sleeve for coaction with the coupling-pins last mentioned, and means applied to the projecting outer end of the sleeve for operating the same.

14. In a power-transmitting mechanism, the combination with a rotatable case, of a driven shaft, a fulcrum-gear and a driven gear differentiated from each other in size and arranged concentric with the said case and shaft, a driving-pinion and a driven pinion differentiated in size, rotating together on the same axis, meshing directly into the said fulcrum and driven gears respectively and revolved planetwise around the same with the said case; a controller for the said fulcrum-gear, the said controller comprising a frame-plate, a friction band or strap, a bolt, and a handle connected with the said band and bolt for the operation thereof; and means for transmitting the rotatable movement of the said case to the said shaft for the forward rotation thereof, and for transmitting the movement of the said driven gear to the said shaft for the reverse rotation thereof thereby.

In testimony whereof I have signed this specification in the presence of two subscribing witnesses.

JOSEPH PETRELLI.

Witnesses:
    FREDERIC C. EARLE,
    GEORGE D. SEYMOUR.